United States Patent

[11] 3,542,392

| [72] | Inventor | James C. Cumming<br>Plesant Ridge, Michigan |
|---|---|---|
| [21] | Appl. No. | 767,125 |
| [22] | Filed | Oct. 14, 1968 |
| [45] | Patented | Nov. 24, 1970 |
| [73] | Assignee | Rockwell-Standard Company<br>Pittsburgh, Pennsylvania<br>a corporation of Delaware. |

[54] STEERING MECHANISM
10 Claims, 2 Drawing Figs.

[52] U.S. Cl. ................................................ 280/96.1, 308/120
[51] Int. Cl. .................................................. B62d 7/18
[50] Field of Search........................................ 280/96.1, 96.3; 287/100; 308/120A, 120, 121, 36.1, 78, 172

[56] References Cited
UNITED STATES PATENTS

| 525,338 | 9/1894 | Corneliussen | 308/9 |
|---|---|---|---|
| 1,287,143 | 12/1918 | Troxler | 287/100X |
| 1,414,737 | 5/1922 | Gulick | 287/100 |
| 1,471,575 | 10/1923 | Simons | 280/96.1 |
| 1,981,802 | 11/1934 | Gleason | 280/96.1X |
| 2,665,957 | 1/1954 | Glander | 280/96.1X |
| 2,752,209 | 6/1956 | Acterman et al. | 308/172 |
| 3,179,476 | 4/1965 | Hurwitt | 308/36.1 |
| 3,342,507 | 9/1967 | Koch et al | 287/100X |
| 3,441,288 | 4/1969 | Boughner | 280/96.1 |

*Primary Examiner*—Benjamin Hersh
*Assistant Examiner*—Leslie J. Paperner
*Attorney*—Strauch, Nolan, Neale, Nies & Kurz ABSTRACT: A vehicle-steering axle incorporates kingpins on opposite ends of an axle beam pivotally connected to steering knuckles mounting the wheels, each kingpin having a cylindrical lower end rotatably and axially displaceably mounted within a cylindrical bore or chamber on the steering knuckle in end abutment with a supporting body of grease or like lubricant that serves as a thrust bearing and is also continuously displaced by vehicle weight to radially lubricate the kingpin lower end.

Patented Nov. 24, 1970

3,542,392

INVENTOR.
JAMES C. CUMMING
BY
Strauch, Nolan, Neale,
Nies & Kurz
ATTORNEYS

STEERING MECHANISM

BACKGROUND AND SUMMARY OF INVENTION

The invention relates to steering axle assemblies, usually front axles, for vehicles wherein the wheels are mounted on spindles at the outer ends of steering knuckles pivoted upon the opposite ends of the axle beam. In operation the moving vehicle is steered by mechanism that simultaneously turns both knuckles and considerable effort has been devoted to improving the operative connection between the kingpin and the knuckle associated with it for maximum safety and efficient controlled operation with minimum wear.

In prior steering axle constructions it has been considered essential as a practical and safety feature to employ a sturdy mechanical thrust bearing between the kingpin and the lower arm of the knuckle yoke, to adequately carry the vehicle weight, and at the same time the lower end of the kingpin is journaled in the lower knuckle arm. Besides the expense of providing and mounting the bearing, it must be lubricated separately from the journal. A typical commercial prior art construction is illustrated in Glander, U.S. Pat. No. 2,665,957 wherein a tapered roller bearing provided between the axle beam and knuckle acts as thrust bearing, and the kingpin turns in a lubricated bearing sleeve in the lower knuckle arm. Alden, Pat. No. 1,371,594 discloses a steering assembly wherein a radially journaled kingpin seats on a bottom metal thrust bearing that is lubricated by oil descending from the journal, and this is exemplary of other known prior art.

The invention contemplates pivoting the steering knuckle on the kingpin by a novel construction wherein mechanical or metal thrust bearings are eliminated, and the vehicle weight is supported by a body of grease or greaselike lubricant that not only functions as a thrust bearing but also is displaced by vehicle weight to replenish a radial lubricant film between the kingpin and knuckle, and this is a major object of the invention.

Further objects of the invention include novel sealing arrangements for the foregoing including a special seal to restrict displacement out of the radial film and the provision of a safety thrust bearing arrangement in the form of a body of hard plastic bearing material to support the kingpin should the grease body become accidentally depleted.

Other detailed objects will become apparent from the claims.

PREFERRED EMBODIMENTS

Figure 1:
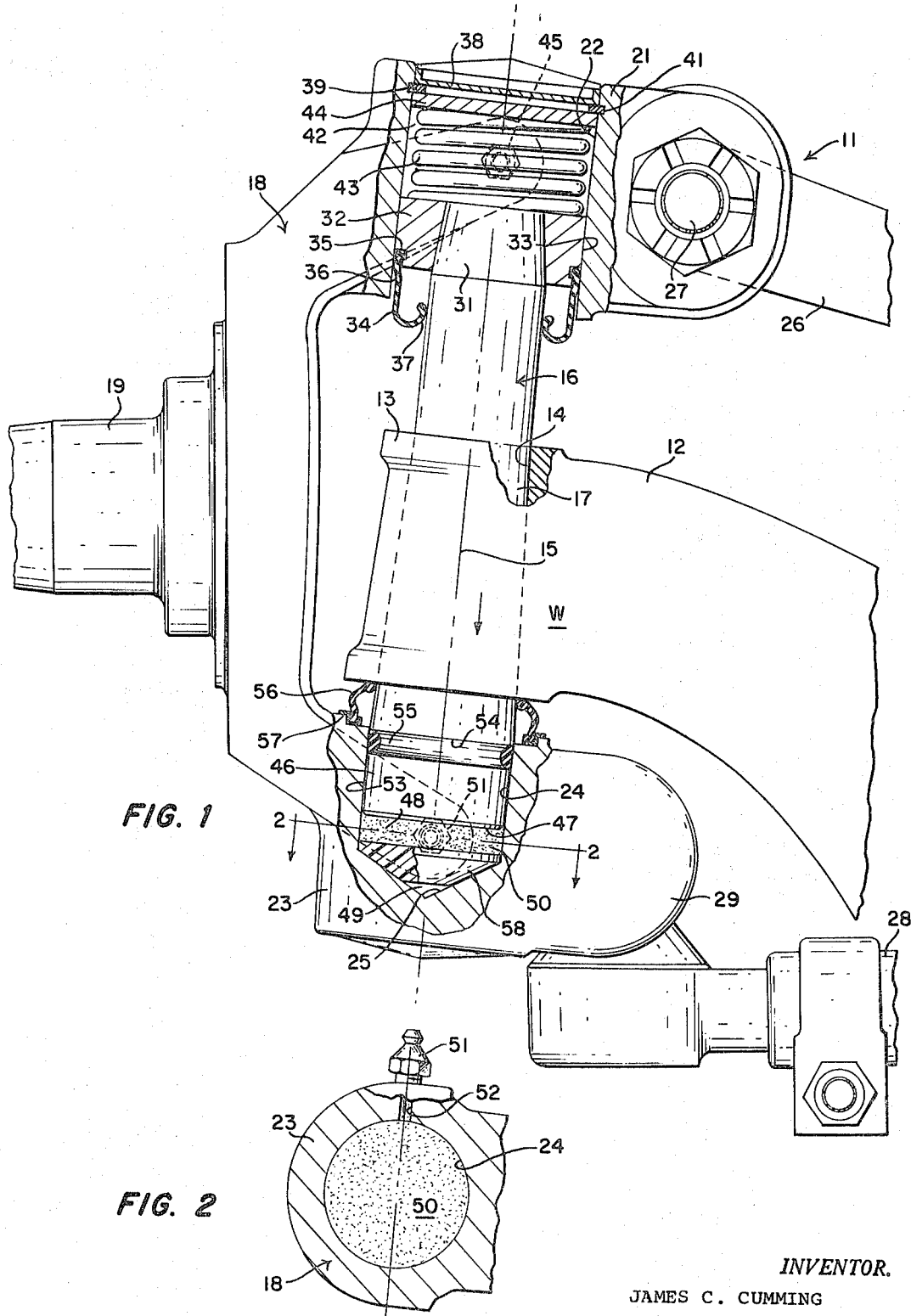
FIG. 1 is a fragmentary side elevation, partially broken away and in section, showing one end of a front axle incorporating the invention according to a preferred embodiment.
Figure 2:
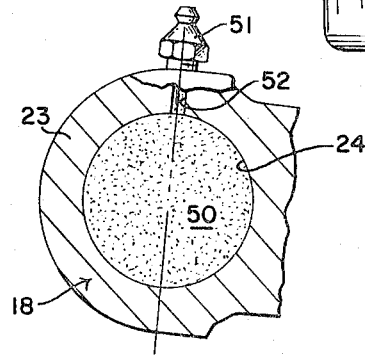
FIG. 2 is a section substantially on line 2—2 of FIG. 1 showing the lubricant pressure chamber at the lower end of the kingpin.

FIG. 1 shows one end of a transverse front axle assembly 11 for a vehicle wherein a rigid axle beam 12 of suitable configuration is formed at each opposite end with a hollow boss 13 containing a frustoconical bore 14 disposed with its axis 15 either vertical or at a small angle to vertical to provide for camber. Axle beam 12 is of identical structure at opposite ends, and only one end is shown in FIG. 1 for improving clarity of description of the invention.

A kingpin 16 has a frustoconical intermediate section 17 tightly nonrotatably fitted within bore 14 so as to be rigid and substantially integral with the axle beam. A steering knuckle 18 is mounted for pivotal movement about the kingpin axis which coincides with axis 15.

Steering knuckle 18 comprises an outwardly extending wheel bearing spindle 19 on which is rotatably mounted the usually ground engaging wheel (not shown). Steering knuckle 18 comprises an upper integral yoke arm 21 having a cylindrical through bore 22, and a lower integral yoke arm 23 having an upwardly open cylindrical bore 24 formed with a closed generally conical bottom end wall 25.

A conventional steering arm 26 is operably connected to knuckle 18 at 27, and a tie rod assembly 28 is operably connected to the knuckle at 29. Steering arm 26 is suitably connected to the usual vehicle-steering system, and tie rod 28 interconnects the knuckles at opposite ends of the axle, both in conventional fashion.

The upper end of kingpin 16 extends within bore 22 and is there formed with a frustoconical tapered end section 31 rotatably fitted within a bearing sleeve 32 having a cylindrical external surface 33 in rotating bearing engagement with bore 22. An annular flexible seal element 34 mounted in a groove 35 on sleeve 32 has its upper end 36 compressed in sealing engagement with bore 22 and is inturned at its lower end 37 to resiliently engage kingpin 16. Seal 34 thus prevents entry of dust and moisture into the lower end of bore 22 to protect the bearing surface.

At the upper end of bore 22, a sealing disc 38 tightly closes the bore above a snapring 39 mounted in a groove 41 in the bore wall. Between disc 38 and the upper end of kingpin 16 is a bore chamber 42 containing a compressed coil spring 43 extending between sleeve 32 and a circular retainer plate 44 slidable in bore 22 and abutting the underside of snapring 39. A grease fitting 45 permits lubricant to be introduced within chamber 42 for lubricating the bearing surfaces between sleeve 32, kingpin end 31 and bore 22. Spring 43 axially biases sleeve 32 to take up manufacturing tolerances and wear.

The lower end of kingpin 16 is a cylindrical section 46 that extends from the lower edge of axle beam bore 14 rotatably into bore 24 and terminates short of the bottom of the bore in a flat end surface 47, so that bore 24 contains below the kingpin end a cylindrical chamber space 48 and the space 49 below it defined by wall 25.

a check valve lubricant fitting 51 at the outer end of a radial passage 52 provides for introduction of fluent plastic lubricant under pressure into chamber 48.

The external cylindrical surface 53 of the lower kingpin section is smooth and finished and sized to have a rotating bearing fit with the smooth finished surface of bore 24.

Near the upper end of bore 24 the lower section of the kingpin is formed with an annular groove 54 containing a radially compressed resilient seal ring 55 in sliding engagement with bore 24. An annular flexible seal element 56 surrounds the kingpin between the axle beam and the steering knuckle. The lower end of element 56 is carried by a metal retainer 57 nonrotatably clamped to knuckle arm 23, and the upper end of seal element 56 resiliently bears on the juncture where kingpin 16 leaves the axle beam bore 14. Seal 56 prevents entry of dust and moisture into bore 24 to protect the bearing surfaces therein.

A safety backup plug 58 of nylon or some other hard dry plastic bearing material is mounted in the space 49 below the lubricant space 48, and plug 58 is preferably formed with a frustoconical lower surface seating on wall 25. In normal operation, as will appear, plug 58 does not perform any operative function as long as space 48 contains lubricant under pressure.

In the operative assembly lubricant in the form of a grease is introduced through fixture 45 into chamber 42 at sufficient pressure to maintain lubrication of the bearing surfaces between sleeve 32, kingpin end 31, and bore 22. Lubricant in the form of a grease is also introduced through fitting 51 into chamber 48 where it is confined. The cylindrical lower section of kingpin 16 is effectively a piston capable of reciprocation in the cylinder provided by bore 24, so that the entire vehicle weight at that end of the axle indicated by the arrow W in FIG. 1 is applied as a thrust force against the body of grease 50 in chamber 48.

The dual function of grease body 50 is to serve as a thrust bearing for the kingpin 16 and to lubricate the radial bearing between kingpin section 46 and bore 24. The thrust force due to weight of the vehicle is distributed over the area of contact between end surface 47 of the kingpin and the grease body. The pistonlike action of the kingpin in bore 24 is relied upon to gradually displace into the space between kingpin surface 48 and bore 24 enough lubricant to provide and replenish radial bearing lubrication.

Thus the invention requires careful correlation between the viscosity of the grease in body 50 and the dimensions of the space between surface 48 and bore 24. This space must be sufficiently large radially to permit the required maintenance of the lubricant film, but on the other hand to maintain an effective thrust bearing function it must be sufficiently small radially and of such length as to inhibit undesirably rapid displacement of lubricant therethrough under operational forces such as vehicle weight and road shock. The efficiency of the annular seal at 54, 55 is therefore important in that it usefully impedes the displacement of lubricant out of the upper end of bore 24.

The actual lubricant pressure within chamber 48 need be only that of the usual grease gun and periodic maintenance insures that the grease body 50 does not become exhausted. Should the grease body 50 accidentally or carelessly become exhausted, the kingpin will lower in bore 24 until the flat bottom surface engages plug 58 which has adequate support strength and bearing qualities to serve as a thrust bearing during an emergency period. When grease is introduced into chamber 48 the grease pressure will force the kingpin upward until seal 55 emerges from the bore and lubricant forced upward in the space between the kingpin and bore will eventually become displaced outwardly at the flexible upper end of seal 56, which is a signal that the grease body 50 is adequately reformed.

Then the lubricant pressure gun is removed and the vehicle weight soon normalizes the parts to the condition shown in FIG. 1.

In the upper lubricant chamber 42 road shocks will cause a pumping action displacing lubricant into the bearing spaces at 33, 22 and 31.

The foregoing construction provides a steering assembly that does not require mechanical thrust bearings hitherto considered essential in practical automotive vehicles for supporting the axle ends on the steering knuckles. The steering effort involves shear of the grease at the interface between body 50 and surface 47 and this contributes to ease of steering.

The embodiments of the invention in which an exclusive property or privilege is claimed are defined as follows.

I claim:

1. In a steerable axle assembly, an inner axle member, a generally vertical kingpin fixed upon an end of said member, an outer axle member carrying a wheel mounting spindle and having an upwardly open cylindrical bore closed at its lower end and surrounding the lower end of said kingpin, a cylindrical section of the lower end of said kingpin extending rotatably and axially slidably into said lower bore, a body of plastic lubricating material within said lower bore in supporting thrust bearing engagement with the lower end of said kingpin and in communication with the lower end of the radial bearing space between said lower end section of the kingpin and said lower bore whereby in response to vehicle weight on said axle assembly lubricant from said body may displace into said radial bearing space for providing and maintaining a lubricating film therein, said space being sufficiently large radially and so correlated with the viscosity of said material to permit maintainance of an adequate lubricant film surrounding the lower end of said kingpin, but being sufficiently small radially and of such length as to inhibit undesirably rapid displacement of lubricant material therethrough under operational forces such as road shocks, means for introducing lubricant under pressure directly into said lower bore below the kingpin end to form said body, and means providing a lubricant film retaining seal between said cylindrical section of the kingpin and said lower bore.

2. In the axle assembly defined in claim 1, means providing a peripherally enclosed annular seal structure at the upper end of said lower bore.

3. In the axle assembly defined in claim 1, means providing a peripheral groove on said cylindrical section of the kingpin and a radially compressed resilient ring in said groove having its outer periphery in rotating sliding engagement with the bore surface.

4. In the axle assembly defined in claim 1, means mounting an annular shield on one of said axle members enclosing the kingpin between the axle members and extending into resilient sliding engagement with the other axle member.

5. In the axle assembly defined in claim 1, means providing an upper cylindrical bore in said outer axle member wherein the upper end of said kingpin is rotatably mounted, and means in said upper bore above the kingpin resiliently downwardly biasing said kingpin.

6. In the axle assembly defined in claim 5, there being a chamber in said bore above the upper end of said kingpin and said resilient means comprising a compressed coil spring in said chamber having its upper end in abutment with a fixed member in said upper bore, and means for introducing lubricant into said chamber.

7. In the axle assembly defined in claim 1, means providing a passage through said outer axle member for introducing said material into said lower bore, and a check valve in said passage preventing displacement of said material out of said body.

8. In a steerable axle assembly, an inner axle member, a generally vertical kingpin fixed upon an end of said member, an outer axle member carrying a wheel mounting spindle and having an upwardly open cylindrical bore closed at its lower end and surrounding the lower end of said kingpin, a cylindrical section at the lower end of said kingpin extending rotatably and axially slidably into said lower bore, a body of plastic lubricating material within said lower bore in supporting thrust bearing engagement with the lower end of said kingpin and in communication with the lower end of the radial bearing space between said lower end section of the kingpin and said lower bore whereby in response to vehicle weight on said axle assembly lubricant from said body may displace into said radial bearing space for providing and maintaining a lubricating film therein, and means in the closed end of said lower bore below said body of lubricant material providing an emergency thrust bearing for the lower end of said kingpin.

9. In the steerable axle assembly defined in claim 8, said emergency thrust bearing being a hard solid member of plastic material seated in the closed lower end of said bore.

10. In the steerable axle assembly defined in claim 9, said thrust bearing member being an integral nylon element.